United States Patent
Moore, Jr.

(10) Patent No.: US 9,367,217 B2
(45) Date of Patent: Jun. 14, 2016

(54) MOBILE TRAVEL INFORMATION SYSTEM AND METHOD

(71) Applicant: Hertz System, Inc., Park Ridge, NJ (US)

(72) Inventor: Robert D. Moore, Jr., Oklahoma City, OK (US)

(73) Assignee: Hertz System, Inc., Park Ridge, NJ (US)

( * ) Notice: Subject to any disclaimer, the term of this patent is extended or adjusted under 35 U.S.C. 154(b) by 70 days.

(21) Appl. No.: 14/010,226

(22) Filed: Aug. 26, 2013

(65) Prior Publication Data

US 2015/0057837 A1 Feb. 26, 2015

(51) Int. Cl.
| | |
|---|---|
| *G06Q 10/02* | (2012.01) |
| *G06F 3/0484* | (2013.01) |
| *G06Q 30/06* | (2012.01) |
| *G06Q 10/00* | (2012.01) |
| *G01C 21/20* | (2006.01) |
| *H04W 4/02* | (2009.01) |

(52) U.S. Cl.
CPC ............ *G06F 3/04842* (2013.01); *G01C 21/20* (2013.01); *G06Q 10/02* (2013.01); *G06Q 10/20* (2013.01); *G06Q 30/0645* (2013.01); *H04W 4/021* (2013.01); *H04W 4/028* (2013.01)

(58) Field of Classification Search
CPC ............................ G06Q 10/02; G06Q 30/0645
See application file for complete search history.

(56) References Cited

U.S. PATENT DOCUMENTS

| | | | |
|---|---|---|---|
| 8,014,942 B2 | 9/2011 | Moinzadeh et al. | |
| 8,095,394 B2 * | 1/2012 | Nowak et al. | ..................... 705/4 |
| 8,102,253 B1 | 1/2012 | Brady, Jr. | |
| 8,467,826 B1 * | 6/2013 | DiSanto | ..................... 455/550.1 |
| 8,510,196 B1 * | 8/2013 | Brandmaier et al. | ........... 705/35 |
| 2001/0032104 A1 | 10/2001 | Hall et al. | |
| 2004/0242198 A1 * | 12/2004 | Oyagi et al. | ................... 455/411 |
| 2005/0216281 A1 | 9/2005 | Prior | |
| 2005/0273251 A1 * | 12/2005 | Nix et al. | ...................... 701/201 |
| 2007/0194940 A1 | 8/2007 | Valluru | |
| 2007/0219706 A1 * | 9/2007 | Sheynblat | ...................... 701/200 |
| 2008/0195306 A1 * | 8/2008 | Moinzadeh et al. | .......... 701/201 |
| 2008/0249983 A1 * | 10/2008 | Meisels | ............. G06F 17/30241 |
| 2008/0275786 A1 * | 11/2008 | Gluck | .................... G06Q 30/02 |
| | | | 705/14.35 |
| 2008/0293392 A1 * | 11/2008 | Strother | ...................... 455/414.2 |
| 2009/0091477 A1 * | 4/2009 | McCall | ................... G01S 19/42 |
| | | | 340/990 |
| 2010/0057339 A1 * | 3/2010 | Pryakhin et al. | .............. 701/200 |
| 2010/0075648 A1 | 3/2010 | Matsuoka et al. | |
| 2010/0125407 A1 * | 5/2010 | Cho | ................... G01C 21/3602 |
| | | | 701/533 |
| 2010/0151838 A1 * | 6/2010 | Wormald et al. | .......... 455/414.1 |
| 2010/0190510 A1 * | 7/2010 | Maranhas et al. | ......... 455/456.1 |

(Continued)

OTHER PUBLICATIONS

International Searching Authority (ISA/PCT/US) International Search Report and Written Opinion mailed Jan. 2, 2015; International Application No. PCT/US2014/052543.

(Continued)

*Primary Examiner* — Thomas G Black
*Assistant Examiner* — Peter D Nolan
(74) *Attorney, Agent, or Firm* — Hinshaw & Culbertson LLP

(57) ABSTRACT

A mobile travel information system and method are disclosed for providing a variety of travel-related information and services to a traveler via a personal electronic device. A custom application installed on the personal electronic device provides, for example, itinerary management, navigational assistance, local recommendations, driving condition alerts, etc. The system may interface with airline, hotel and car rental reservation systems and obtain data from a variety of sources, so as to function as a mobile personal concierge for a traveler.

13 Claims, 13 Drawing Sheets

(56) References Cited

U.S. PATENT DOCUMENTS

| | | |
|---|---|---|
| 2010/0217630 A1 | 8/2010 | Ehrman et al. |
| 2010/0222033 A1* | 9/2010 | Scott et al. .................. 455/414.1 |
| 2010/0332282 A1 | 12/2010 | Bradley et al. |
| 2011/0264501 A1* | 10/2011 | Clyne ........................ 705/14.25 |
| 2011/0313937 A1 | 12/2011 | Moore, Jr. |
| 2012/0028680 A1* | 2/2012 | Breed ......................... 455/556.1 |
| 2012/0066232 A1* | 3/2012 | Engelhardt ............ G01C 21/32 707/748 |
| 2012/0066393 A1* | 3/2012 | Tekwani ........................ 709/226 |
| 2012/0072249 A1 | 3/2012 | Weir et al. |
| 2012/0313751 A1* | 12/2012 | Kaelbling et al. ........... 340/5.61 |
| 2013/0024060 A1 | 1/2013 | Sukkarie et al. |
| 2013/0024233 A1 | 1/2013 | Aaron et al. |
| 2013/0226371 A1* | 8/2013 | Rovik et al. ....................... 701/2 |
| 2013/0246173 A1* | 9/2013 | Berkley et al. .............. 705/14.53 |
| 2013/0252591 A1* | 9/2013 | Sasaki et al. ................ 455/414.1 |
| 2013/0297353 A1* | 11/2013 | Strange et al. ..................... 705/4 |
| 2014/0095284 A1* | 4/2014 | Strygin .................. G06Q 50/14 705/14.23 |
| 2014/0222298 A1* | 8/2014 | Gurin ...................... G06F 17/00 701/49 |
| 2014/0256304 A1* | 9/2014 | Frye et al. ..................... 455/418 |

OTHER PUBLICATIONS

International Searching Authority (ISA/PCT/US) International Search Report and Written Opinion mailed Aug. 5, 2014; International Application No. PCT/US2014/019486.

* cited by examiner

MOBILE TRAVEL INFORMATION SYSTEM AND METHOD

FIELD OF THE INVENTION

The present invention relates to a mobile travel information system and method of providing a variety of travel-related information and services to a traveler via a personal electronic device.

BACKGROUND OF THE INVENTION

Travelling, particularly to a new or unfamiliar destination, can present a number of challenges to the traveler, whether the trip is for business or leisure. For instance, unfamiliarity with airports, local transportation options, local roads and traffic patterns, and local entertainment and dining locations, as well as the need to manage a business and/or personal travel itinerary, may be challenging. In addition, a traveler may face unforeseen circumstances, such as the need to extend a trip, which may necessitate changing transportation and accommodation reservations.

A need therefore exists for a system and method of providing travel-related information and services to a traveler to make the travel experience more convenient and enjoyable. Ideally, a traveler needs a "trusted mobility partner" who can provide a wide variety of useful information and a range of helpful services.

BRIEF SUMMARY OF THE INVENTION

In accordance with one aspect of the present invention, a travel information system is provided for enhancing the convenience of a travel experience on a 24/7 basis. The system includes a central server and a database operably connected to the central server; an application program ("app") adapted for installation and operation on a mobile electronic device, such as a smartphone. Wireless communication means, such as a satellite or cellular network, allow wireless communication of data between the central server and the mobile electronic device. For purposes of the invention, "wireless communication of data" or "wirelessly communicating data" refers to communication of data in which data travels wirelessly for any portion of the path from the sending device to the receiving device. In turn, the central server is communicatively linked to at least one third-party server. The app includes instructions for the mobile electronic device to receive from the central server a travel information update automatically transmitted from the third-party server to the central server. In one embodiment, the central server may be operated by a vehicle rental service provider and the third-party server may be operated by an airline, and the vehicle rental service provider may thus relay flight status information, via the central serve, from the third party server to the mobile electronic device running the app.

Another aspect of the invention is a method for providing mobile travel information comprising providing an app substantially as described above, and operating a central server to relay the travel information from a third party server to a mobile electronic device running the app.

According to still another aspect of the invention, a mobile itinerary management system is provided. The mobile itinerary management system includes a central server; a database operably connected to the central server, the database storing profiles of a plurality of users; a mobile app; and means for communicating data between the central server and a mobile electronic device running the app. The app includes instructions for a user login, entered into a mobile electronic device running the app, to be transmitted from the mobile electronic device to the central server. The central server, in response to receiving the user login, is programmed with instructions to compare the received user login to stored user logins associated with the stored user profiles, and if the received user login matches one of the stored user logins, to transmit itinerary information from the corresponding stored user profile in the database to the mobile electronic device, the itinerary information including at least one event having a scheduled time and location. The app further includes instructions to cause the mobile electronic device to automatically present a reminder of any event in the itinerary automatically transmitted to the mobile electronic device at an appropriate lead time preceding the event. The lead time may be some fixed amount of time, such as 15 minutes, before the event. Alternatively, the lead time may be determined by a travel time from the location of the mobile electronic device to the location of the event, or according to some other formula specified by a user running the app on the mobile electronic device.

According to yet another aspect of the invention, a system is provided for enhancing a travel experience. The system includes a mobile electronic device, such as a smartphone, running an app that programs the mobile electronic device to automatically receive and store input data remotely communicated to the mobile electronic device, the input data corresponding to a travel services customer preference, and to present a message determined by the stored preference data.

In one embodiment, the mobile electronic device includes a GPS component. Thus, when the remotely communicated input data identifies a customer location preference, the message may include information identifying a location corresponding to the location preference and an estimated fastest route to the identified location from the current location of the mobile electronic device. In a further refinement, the input data may include data corresponding to a category of locations preferred by the customer (such as a certain type of restaurant, or historical points of interest, for example), and the app may configure the mobile electronic device to find one or more locations in a database that are within the preferred category. Alternatively, a predictive algorithm (such as one that uses statistics and/or mapping/linking of commonly associated interests) may use manually specified locations of interest of a user to identify and suggest other locations predicted to be of interest to the user. The message may include information identifying the found location in the preferred category if the found location is currently within a predetermined distance (or a predetermined travel time) from the mobile electronic device. Alternatively, the closest "n" number of qualifying locations may be presented, or in a still more sophisticated refinement, a sliding scale algorithm may be provided for adjusting the maximum distance from the device location to a location to be presented depending on a measure of the degree of interest that the user has or is predicted to have in a particular location or type of location.

According to still another aspect of the invention, a system is provided for enhancing the convenience of a vehicle rental experience. The system includes a mobile electronic device running an app configured to communicatively link the mobile electronic device to a rental vehicle and, when the mobile electronic device is linked to the rental vehicle, to cause the mobile electronic device to transmit a signal to the rental vehicle causing the rental vehicle to modify a vehicle comfort setting.

In one embodiment, the comfort setting may include one or more of a seat position parameter (such as a forward-rearward seat position, a seat height, and/or a seat tilt), a steering wheel position parameter, a pedal position parameter, and a mirror position parameter. User preference for position parameters of this type likely corresponds to the physique of the driver. Thus, the signal to the rental vehicle may include information indicating a physical attribute of a rental customer, such as height and pant inseam length (from which the driver's torso length may be roughly extrapolated), and the signal may accordingly cause the rental vehicle to adjust the comfort setting to a predetermined setting based on the physical attribute. The position settings predicted based on a driver's physical attributes may or may not be considered optimal by the particular driver, but they are reasonably likely to be close to the driver's exact preference, thus allowing the driver to optimize the settings by only minor manual adjustments. Besides a "position" setting, the comfort setting may also or alternatively include other types of settings, such as a thermostat temperature, a fan setting, a seat warmer setting, a radio volume, and a radio station frequency.

In another embodiment, the mobile electronic device is configured, when connected to the rental vehicle, to detect a state of a manually adjustable vehicle comfort setting and store input data corresponding to the state of the comfort setting. Thus, the next time the user rents the same or similar vehicle model, the app may automatically (or in response to user input) submit instructions to the vehicle to cause the comfort setting to adjust to a stored state corresponding to the stored input data. The stored setting(s) may be stored locally in the memory of the mobile electronic device, but they may alternatively or additionally be transmitted to the central server so that when the user logs into the app on any device, that device may be used to retrieve the stored settings from the central server and to instruct a vehicle to adjust its settings to the stored settings.

In accordance with yet another aspect of the invention, a system is provided for alerting a vehicle rental customer in a rental vehicle to a driving condition requiring an action by the customer. The system includes a mobile electronic device running an app configured to automatically receive information indicating the driving condition and to communicate a message indicating the driving condition to the customer.

In one embodiment, the app is configured to communicatively link the mobile electronic device to the rental vehicle, so that the mobile electronic device may alert the customer to a vehicle condition communicated by the vehicle to the mobile electronic device. The vehicle condition may, for example, be one or more of a fuel level, a battery charge level, a fluid level, an engine temperature, a brake wear condition, and/or a tire pressure. The alert message presented by the mobile electronic device may also indicate a location near the vehicle where the condition may be resolved, such as a gas station, if the condition is a low fuel level.

In another embodiment, the driving condition may be an environmental condition such as a traffic condition, a weather condition, and/or a road surface condition. In that case, the alert message may include suggested directions for an alternate route to avoid encountering the environmental condition.

In accordance with still another aspect of the invention, a system is provided for real-time remote reporting of damage to a rental vehicle. This aspect may be similar to that described in U.S. patent application Ser. No. 13/782,608 for a virtual rent-a-car/in-car concierge ("vRAC") system, with a key distinction being that the device used to report the damage is specifically a personal mobile electronic device running an app. The app is configured to receive input to the mobile electronic device from a user indicating damage to the vehicle and to automatically transmit the damage input to a remote server. In one embodiment, the user input includes a digital photograph of the damage to the vehicle taken by the user using the device running the app.

In another embodiment, the app instructs the mobile electronic device to display an image of the vehicle on a touch screen and to sense a touch of a user on the touch screen at a location on the image of the vehicle corresponding to the location of the damage on the vehicle. The app may additionally instruct the mobile electronic device to present an interface permitting a user to specify a type of the damage by touching an area of the screen indicating the damage type. For example, the app may instruct the device to display a plurality of damage-type markers, each marker indicating a different type of vehicle damage, and to permit a user to touch the image of a particular marker on the screen and drag the image to a location on the vehicle image to indicate a location on the vehicle of damage of a type corresponding to the marker.

According to still another aspect of the invention, a virtual car rental system is provided. The system includes a mobile electronic device having a memory and running an app that directs the mobile electronic device to store customer data in the memory, receiving means mounted on a vehicle for wirelessly receiving the customer data from the mobile electronic device, and means for automatically unlocking the doors of the vehicle in response to the receiving means receiving customer data corresponding to a particular customer.

According to still another aspect of the invention, a virtual car rental method is provided. The method includes sending to a customer's mobile electronic device a message containing rental vehicle information, wherein the message further contains one or more offers for an alternate vehicle; placing the alternate vehicle on hold the customer for a predetermined hold time after sending the one or more offers; and receiving from the customer's personal electronic device a response to the one or more offers. According to the method, if the customer has accepted one of the offers prior to the expiration of the hold time or prior to the reservation of the corresponding alternate vehicle by another customer, the rental vehicle information is modified based on the response, and a message is sent to the customer's mobile electronic device containing the modified rental vehicle information.

DETAILED DESCRIPTION OF THE INVENTION

With reference to the accompanying figures, in accordance with the present invention, a system and method for enhancing a travel experience are described in this section. The system of the invention is particularly suitable for integration with a virtual rent-a-car/in-car concierge ("vRAC") system such as that described in U.S. patent application Ser. No. 13/782,608, the disclosure of which is hereby incorporated by reference in its entirety, but may also be used independently or in combination with conventional rent-a-car systems as well as airline, hotel and other travel booking systems.

A service provider operates the system and service through a central server, preferably running an internet website. A customer registers for the service by creating a user profile with the service provider. Preferably, the user profile is created online via the website or by downloading an application ("app") to the user's smartphone or other mobile personal electronic device, but the user profile may alternatively be created over the phone, in person, in writing, or by any other suitable means of communicating profile information to a representative of the service provider. The user profile includes personal information, travel preferences and payment information such as credit card data. Travel preferences may include, by way of example, preferred rental vehicle information, preferred airlines and hotel chains, frequent destinations, etc. The profile also includes a user name and password for future access to the system.

An application installed on the user's smartphone or other personal electronic device serves as a "trusted mobility partner" by providing access to all of the information and services offered by the service provider. In one aspect, the app performs the traditional functions of a concierge, by automatically providing personalized travel-related information, recommendations, and navigational instructions, based on location (real-time or prospective) and information provided by the customer to the service provider prior to or during a trip and uploaded to the app. The app provides utilitarian, personalization, customization and entertainment functionality to travelers. In another aspect, the app integrates the travel experience into a customer's digital life stream by enabling interactions that the customer is already used to in other contexts.

Figure 1:
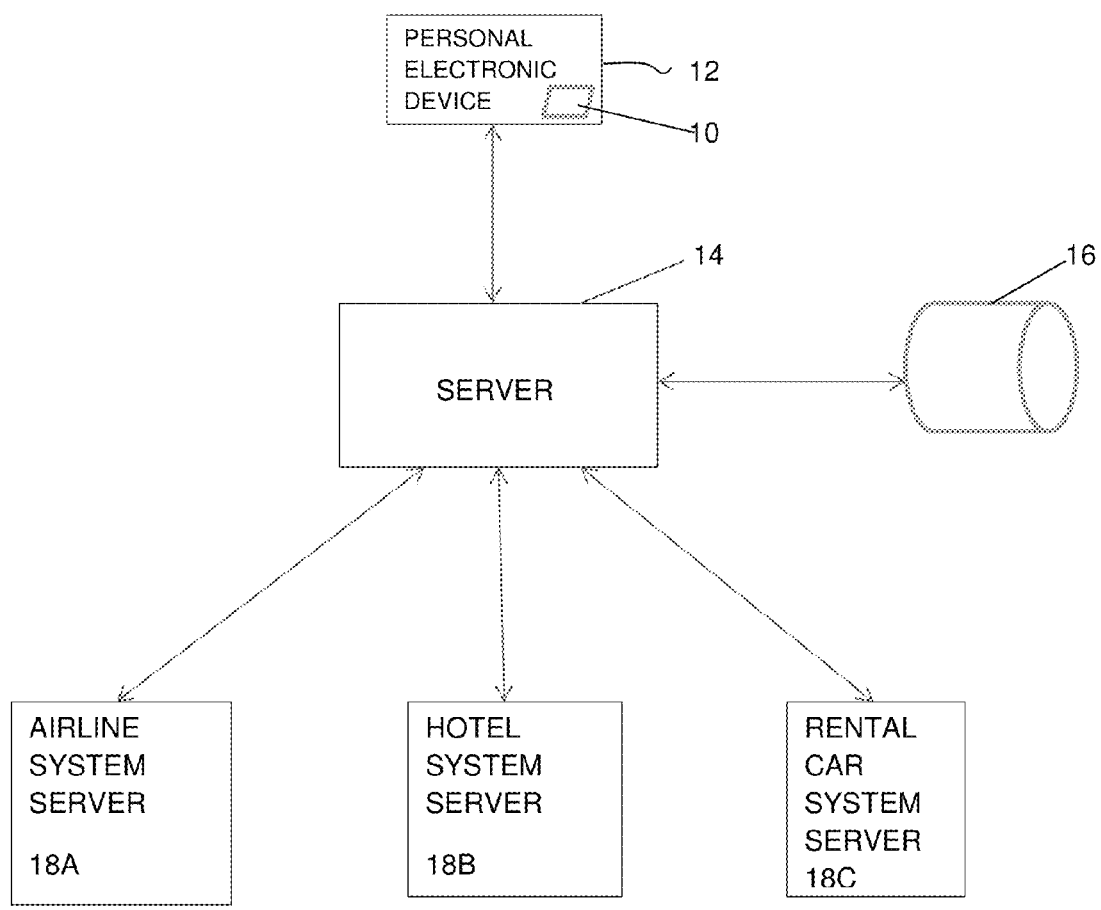
FIG. 1 is a schematic representation of a mobile travel information and service system according to the invention.

As shown schematically in FIG. 1, the system includes an app 10 installed on a mobile personal electronic device 12. Device 12 is capable of sending and receiving data to and from a remote server 14 operated by a service provider. Server 14 is operably connected with a database 16 which contains user profiles and other data. Server 14 is preferably also capable of communication with one or more third-party servers 18, for example, airline reservation system server 18A, hotel reservation server 18B, car rental reservation system server 18C and other reservation systems. Server 14 is also preferably configured to retrieve data from other proprietary and/or publically-available servers and databases, such data including, for example, weather data, traffic data, flight data, etc. If used in combination with a vRAC system, app 10 is also preferably configured to operatively connect device 12 directly to a rental vehicle to send and receive data signals to and from the rental vehicle.

Figure 2:
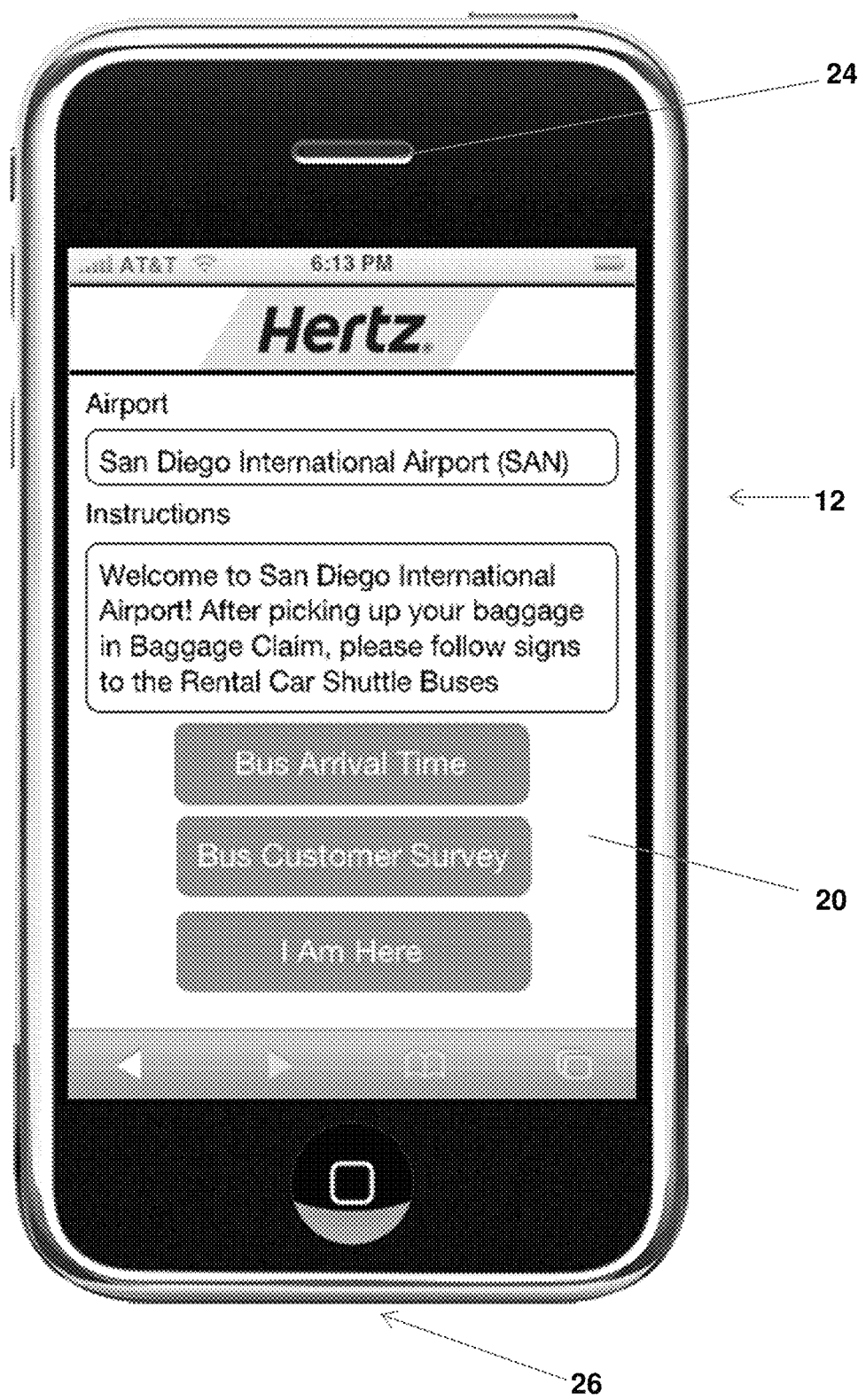
FIG. 2 is a plan view of an electronic device illustrating one embodiment of a graphical user interface according to the invention.

Personal electronic device 12 may be any suitable device of a size to be conveniently carried by the user. Preferably, device 12 includes or is operatively linked to a microprocessor; a memory; wireless communications connectivity; a graphical user display, which may be a touch screen 20, as shown in FIG. 2, or other suitable display screen; a user input device or mechanism, which may for example include touch screen 20, a keypad (not shown), or a touch pad separate from a display screen (not shown); a GPS component (not shown); and/or a speaker 24 and microphone 26. While device 12 may be a fully customized device, built solely for purposes of the system of the invention, it is preferably a commercially-available mobile personal electronic device such as a mobile telephone, PC, or tablet, for example, which is easily customized for use with the system and method of the invention simply by downloading and installing app 10.

In one aspect of the invention, app 10 enables device 12 to function as a personalized travel assistant. For instance, device 12 may serve as a guide and navigational aid to local dining, entertainment, business offices, conference centers, and/or other destinations of interest. In this regard, device 12 may provide a real-time visual overlay of ancillary information highlighting points of interest on a navigational map. Customer-provided preferences with regard to dining, entertainment, and other personal/discretionary travel destinations may be uploaded to device 12 in advance of the trip, and device 12 may display and rank and/or recommend destinations based on how well they match the customer-provided preferences. Customer-supplied dining preferences may specify, for example, specific categories of dining, e.g. vegetarian/vegan, a specific type of food, or a preferred national/ethnic/regional genre/style of cuisine, and device 12 may access internally or externally stored category information pertaining to restaurants in the local vicinity (based on distance or travel time, preferably accounting for real-time traffic information) and then compare that information to the customer's category preferences. Similarly, with regard to entertainment and other points of interest, customer-preferred categories may include types of performance art; types of attractions such as historical, natural, cultural, architectural, amusement-park, or scientific; and/or types of activities such as sports, hiking, games, or gambling, and device 12 may display and rank and/or recommend local points of interest based on how well they match the customer's specified preferences.

In a particular embodiment, device 12 may include a "guided tour" feature that provides streaming audio points-of-interest information pertaining to the present location of the user, as detected by the GPS component of device 12, and/or a recommended driving or walking tour route visually indicated on a GPS map. The audio information conveyed and the driving tour routes recommended in accordance with the guided tour feature may or may not need to be limited by pre-specified customer preferences. This may depend, for example, on whether the particular locality offers a large enough number and variety of attractions in the same general area that it would be impossible to stream the audio describing each of them during the time in which each attraction is nearby, such that it becomes helpful to filter the information based on the customer's personal tastes.

Many modes of operation of the guided tour feature are possible within the scope of the invention. For example, the feature may be configured, when toggled "on" by a user, to stream automatically audio information pertaining to a nearby point of interest whenever a user comes within a certain threshold geographic distance or travel time of the point of interest. Alternatively, in response to proximity of a point of interest, the feature may only automatically display or sound an alert inviting the user to toggle on streaming audio information about the point of interest. As still a further refinement, in that case a user may have the option of toggling the automatic alert mode itself on or off. A user may desire to toggle any automatic alert and/or automatic streaming mode off at certain times to avoid distractions or interruptions, or simply to save the battery life of device 12. In the absence of an automatic audio stream or automatic audio alert mode, or if one or both modes are included but toggled off, the app may also be configured to permit a user to manually initiate a one-time scan for nearby points of interest, which will either automatically initiate or prompt a user to initiate the audio streaming of information pertaining to one or more of those points of interest.

In addition to the many possible modes of operation with respect to degree of automation versus manual control, many variations of the guided tour feature are also possible with respect to the filtering, ranking, and/or automatic selection of a point or points of interest to be narrated by streaming audio, or the order in which a plurality of points of interest in range of the location of device 12 will be narrated. For example, in a simplest mode, the app will simply cause device 12 to display or sound an indication of all nearby points of interest for the user to manually select one or more for narration. Alternatively, the point of interest in range having the highest ranking based on a user-preference metric may be automatically narrated, or conversely, the closest point of interest having at least a threshold user-preference score may be automatically narrated. As yet a further refinement, a user may be able to toggle between the foregoing two modes of selection of a point of interest to narrate, or the user may even customize the respective weights assigned to proximity and a preference score in an algorithm built into the app that automatically selects a point of interest to narrate.

In accordance with another travel-assistant function, device 12 may store in its memory a customer itinerary and provide appropriate audio and/or visual alerts, alarms and reminders based on customer-supplied or automatically-retrieved itinerary information. This itinerary management feature may extend to schedule activities before, during and after the trip. In particular, based on customer-provided or automatically-retrieved flight information, device 12 may provide the user with real-time updates to both outbound and return flight on-time/delayed status, in addition to providing an interface for web-based online flight check-in, where available. The stored-itinerary feature of device 12 may also complement the navigational aid/destination recommender aspect of device 12, in that local destinations may be ranked and/or recommended based on the relative convenience of their locations with respect to the customer's required travel routes from each point on the itinerary to the next.

In another aspect of the travel assistant feature of device 12, device 12 provides real-time driving-condition alerts. These alerts can be related to at least three basic types of driving conditions: (1) forecast, remotely observed, or locally detected weather conditions; (2) traffic conditions, including reports of remotely observed heavy traffic or non-weather precursors of heavy traffic such as accidents, construction activity, or events expecting high attendance such as concerts, festivals or sporting events; and (3) if device 12 is in communication with a rental vehicle, conditions related to the vehicle itself, such as low fuel, low oil, low coolant/antifreeze, low transmission or brake fluid, low tire pressure, high engine temperature/overheating, a burned out external vehicle light bulb, or unusual vibration of a part of the vehicle.

Device 12 can also provide a direct communications link to the service provider. For instance, the user can press a preprogrammed button on the touch screen or keyboard and be connected by telephone or text message with a live customer service agent for personal assistance. Various features of app 10 may be provided to facilitate such communication. For example, device 12 may display on touch screen 20 a graphical user interface permitting a customer to modify, extend, or request to modify or extend a car rental contract by simply inputting instructions via touch screen 20, without the customer having to wait for an available agent. Device 12 may also provide a video display of a live customer service agent on touch screen 20 for live customer service interactions. Microphone 26 and speaker 24 facilitate audio customer service interactions, and optionally, a camera (not shown) may also be included in device 12 for two-way video chat capability between the customer and the customer service agent. The customer service agent may assist with a variety of issues, such as changing hotel or airline reservations, answering questions about the local area and the like.

Since the traveler is using a personal electronic device, the service provider may readily communicate with the traveler prior to, during and after a trip. For example, if the traveler is picking up a rental car at an airport, when making his reservation he may provide flight information. Upon the flight's arrival at the airport, the car rental service sends a message (e.g., an SMS text message and/or email) to the user informing him of his rental car details, including the car that was assigned to him as well as the stall number where the car is located. The customer may also be given the opportunity to change or upgrade the car that was assigned to him. Some customers might not prefer the exact make and/or model of vehicle assigned to them, or their travel plans might have changed and they need a different or larger vehicle. Upon receiving the message, the customer may swap out a preassigned car for a similar car for no additional charge. The customer may also take advantage of a special "deal of the day" promotion and/or upgrade to different car for an additional charge. Preferably, the swap/upgrade function is simple and can be completed in as few as three clicks on the customer's device. Customers are not required to interact with a rental agent to make a change. They simply change their car choice and are given directions to that new vehicle. Preferably, the customer's upgrade/modification choices are presented in a protected manner, at least one of each currently available vehicle option being automatically placed on hold for the customer for a short selection time period, during which time the customer may choose a different vehicle without the possibility that it will no longer be available when he makes his choice. The invention provides a convenient way to make a change without the inconvenience or delay that might be required to deal with a rental agent. After the rental is completed, the rental car service can send to the customer's device additional information such as a thank-you message, copy of a receipt, customer satisfaction survey, promotional offer or the like.

Figure 3:
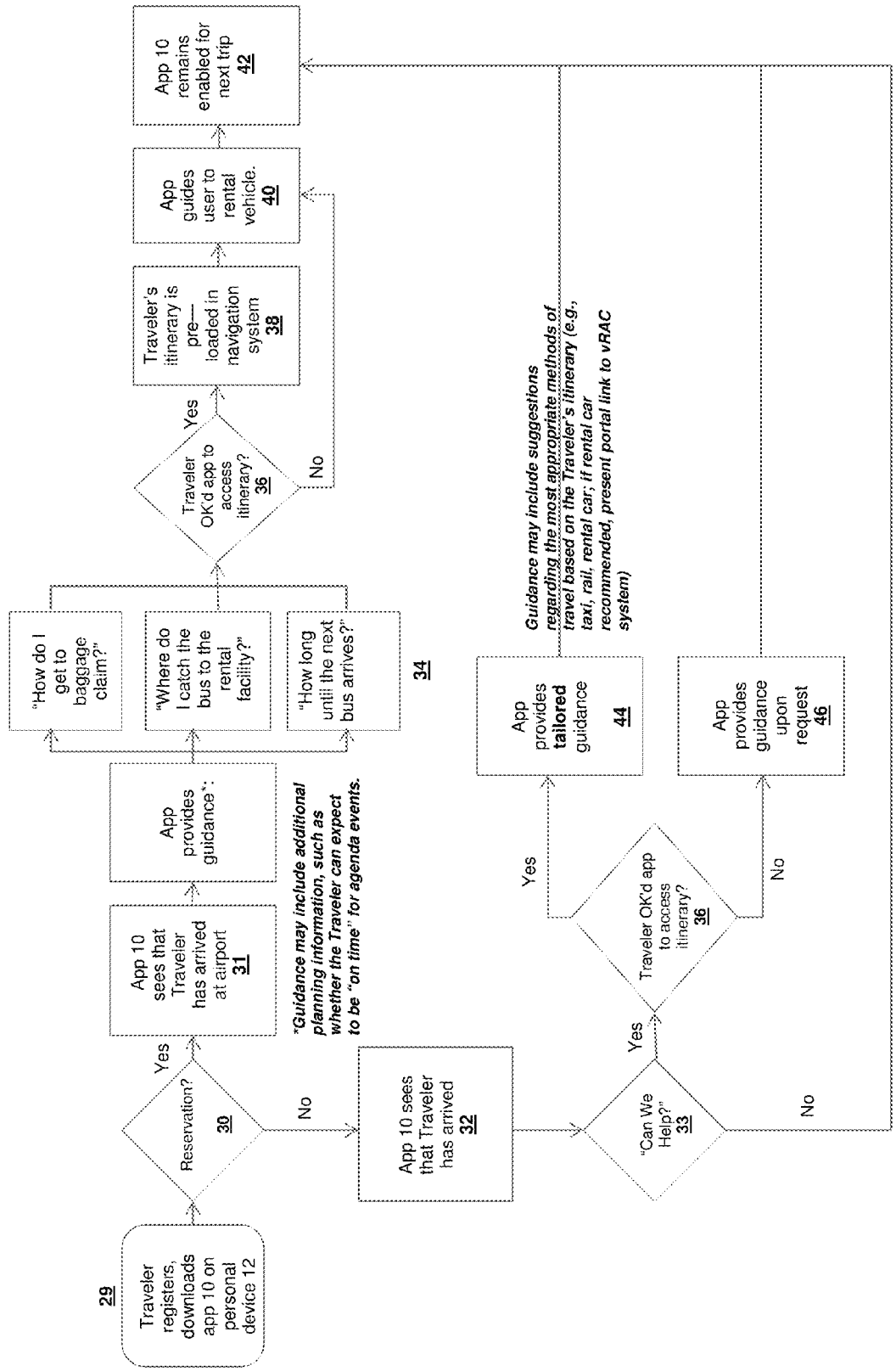
FIG. 3 is a schematic representation of program instructions for a mobile device running a software application according to the invention.
Figure 4A:
FIG. 4a is a representative rental vehicle airport pickup assistance screen shot of an app according to the invention.
Figure 4B:
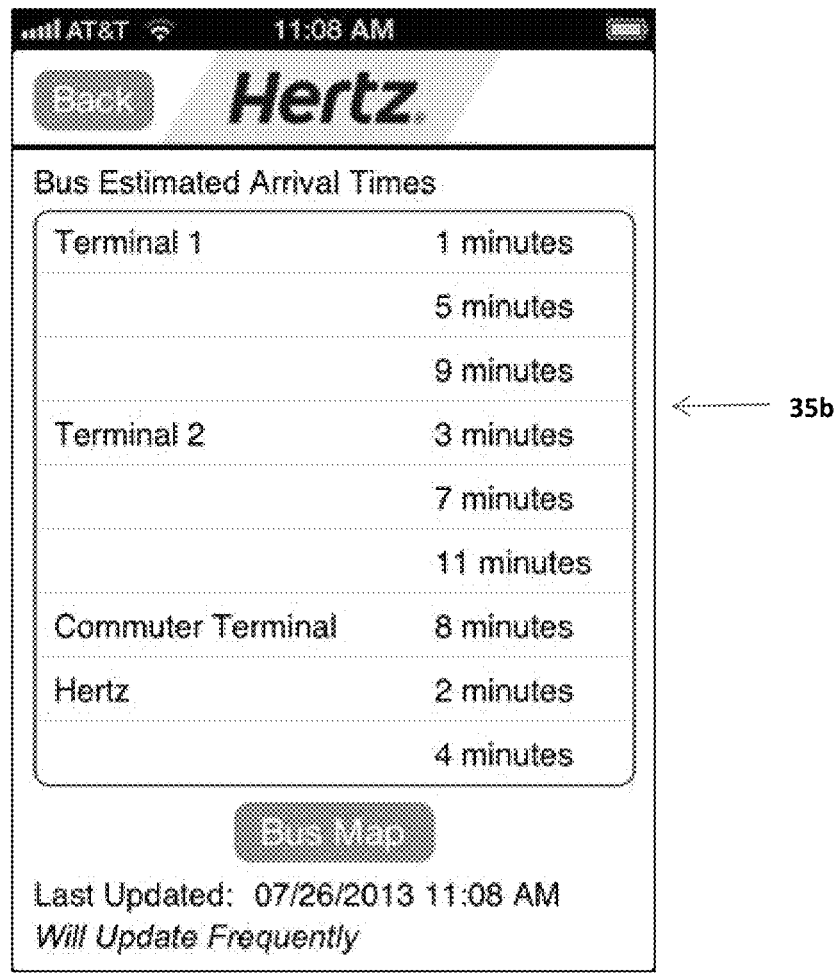
FIG. 4b is another representative rental vehicle airport pickup assistance screen shot of an app according to the invention.
Figure 4C:
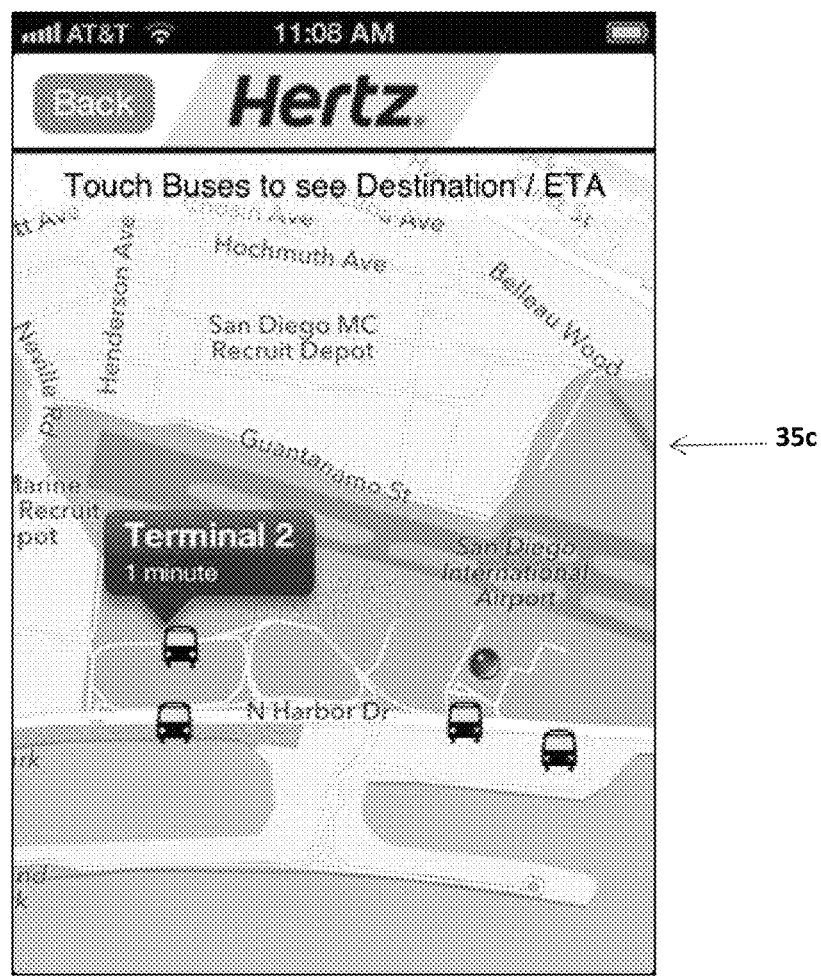
FIG. 4c is another representative rental vehicle airport pickup assistance screen shot of an app according to the invention.
Figure 4D:
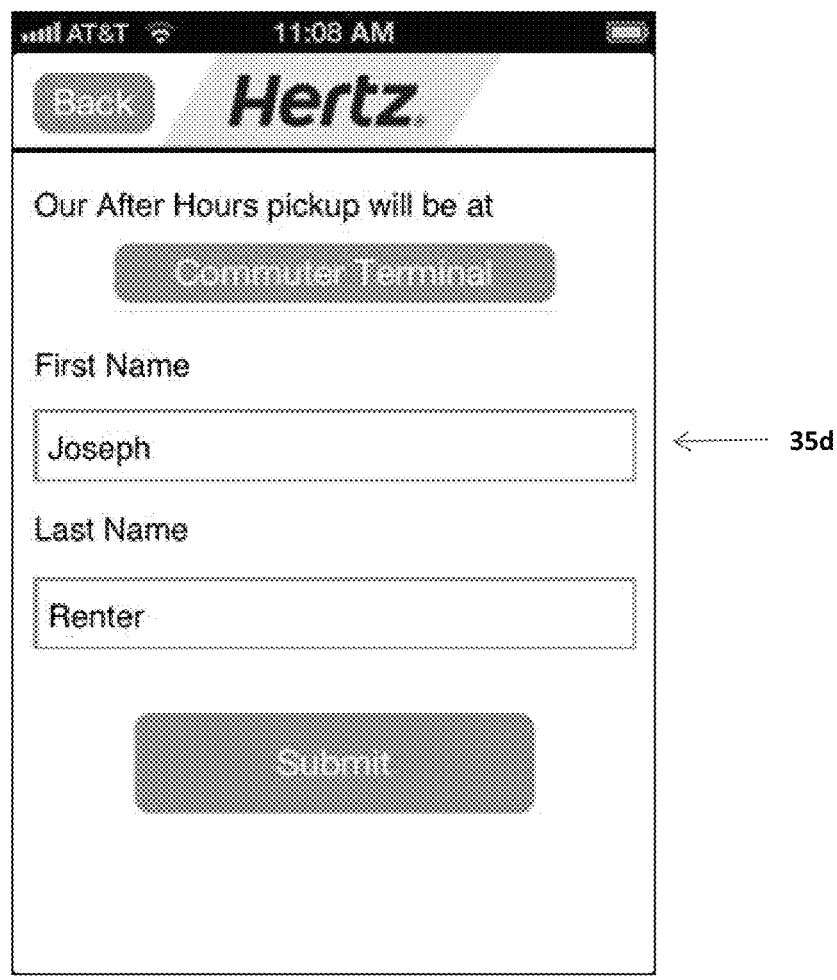
FIG. 4d is another representative rental vehicle airport pickup assistance screen shot of an app according to the invention.
Figure 4E:
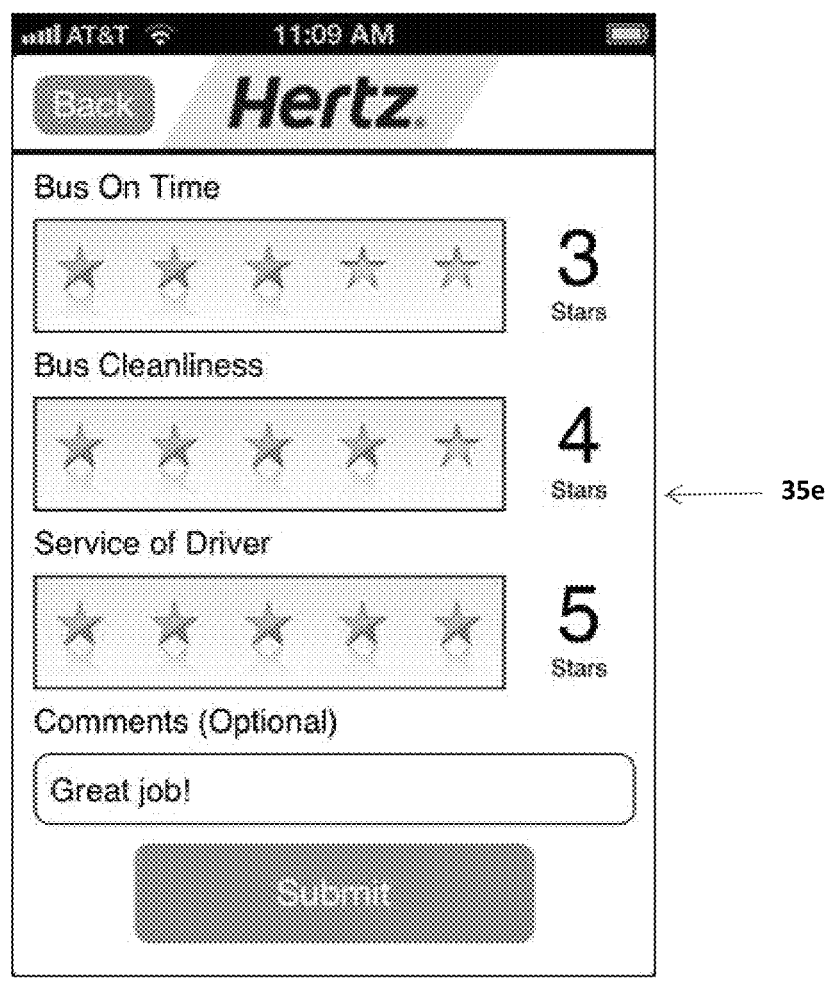
FIG. 4e is another representative rental vehicle airport pickup assistance screen shot of an app according to the invention.
Figure 4F:
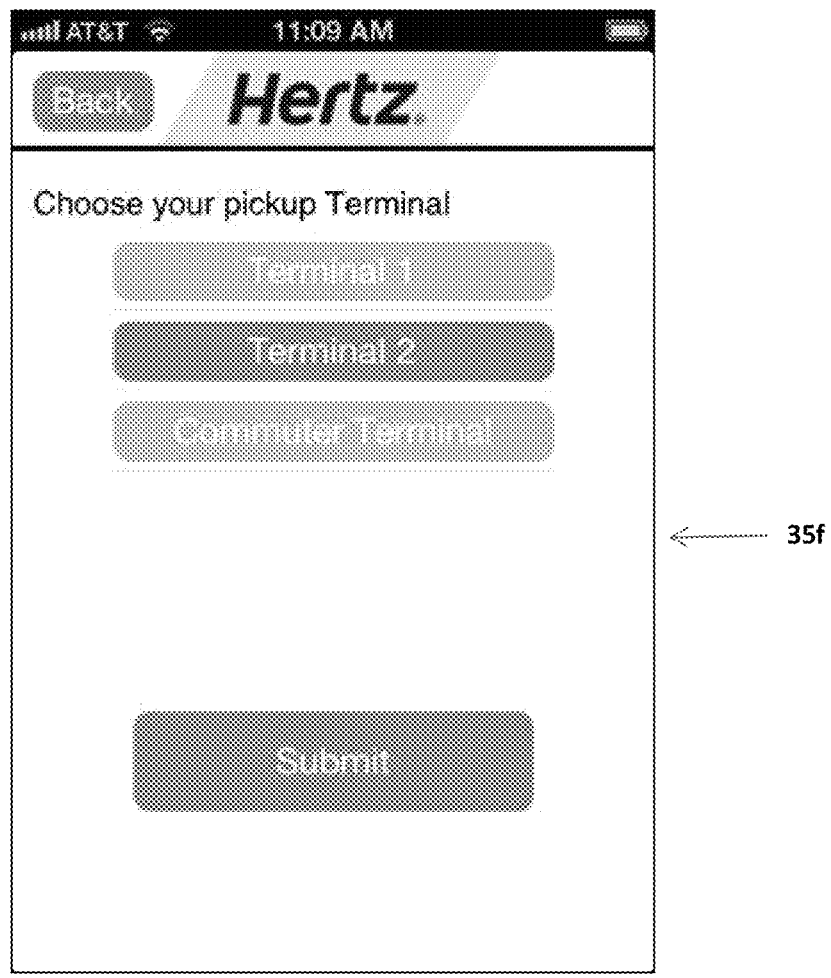
FIG. 4f is another representative rental vehicle airport pickup assistance screen shot of an app according to the invention.
Figure 5A:
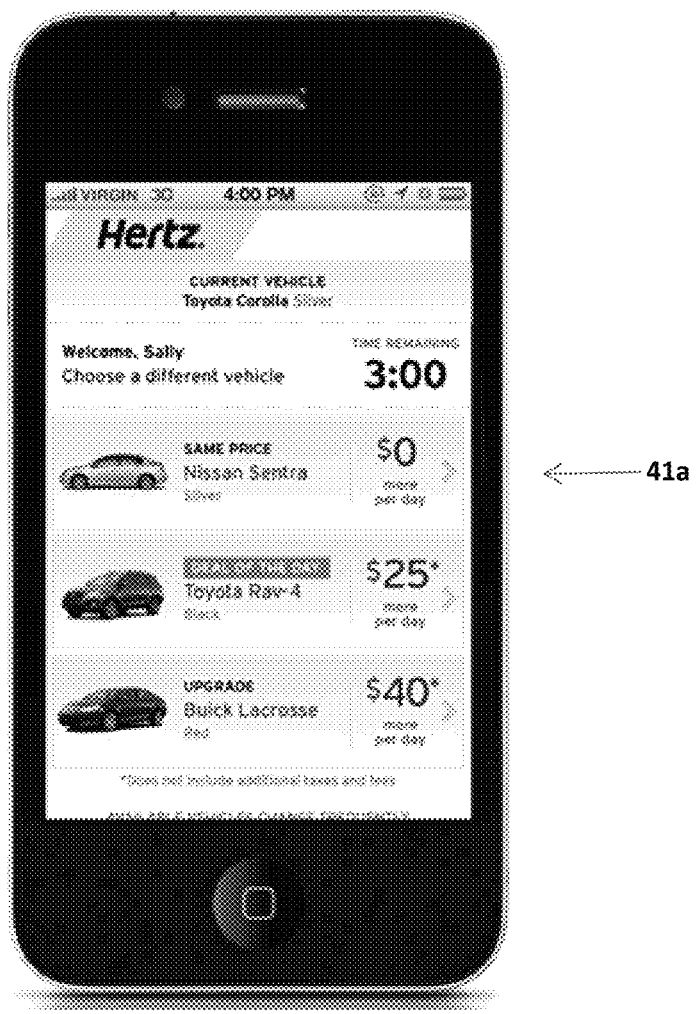
FIG. 5a is a representative alternate vehicle selection screen shot of an app according to the invention.
Figure 5B:
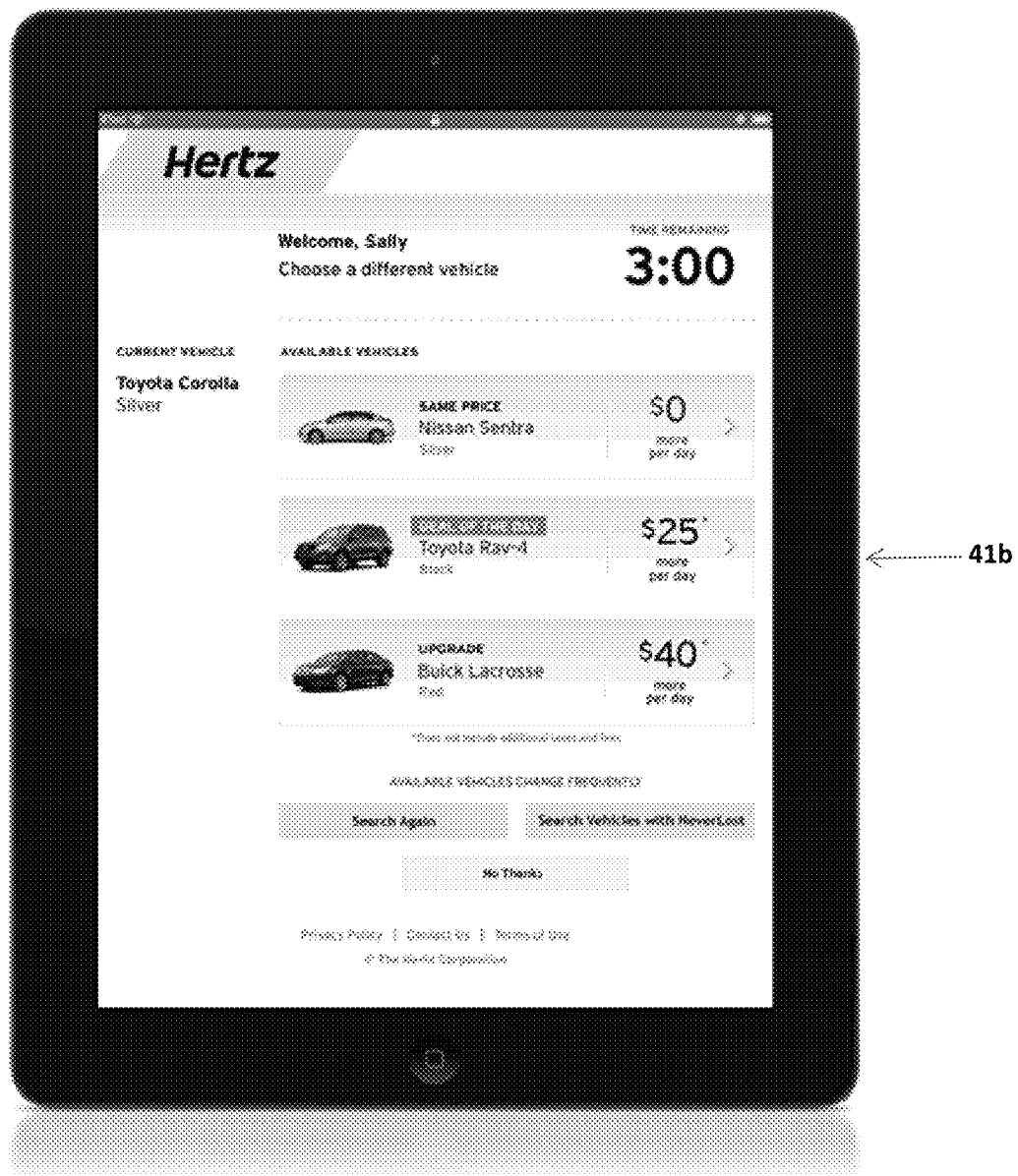
FIG. 5b is another representative alternate vehicle selection screen shot of an app according to the invention.
Figures 5C, 5D:
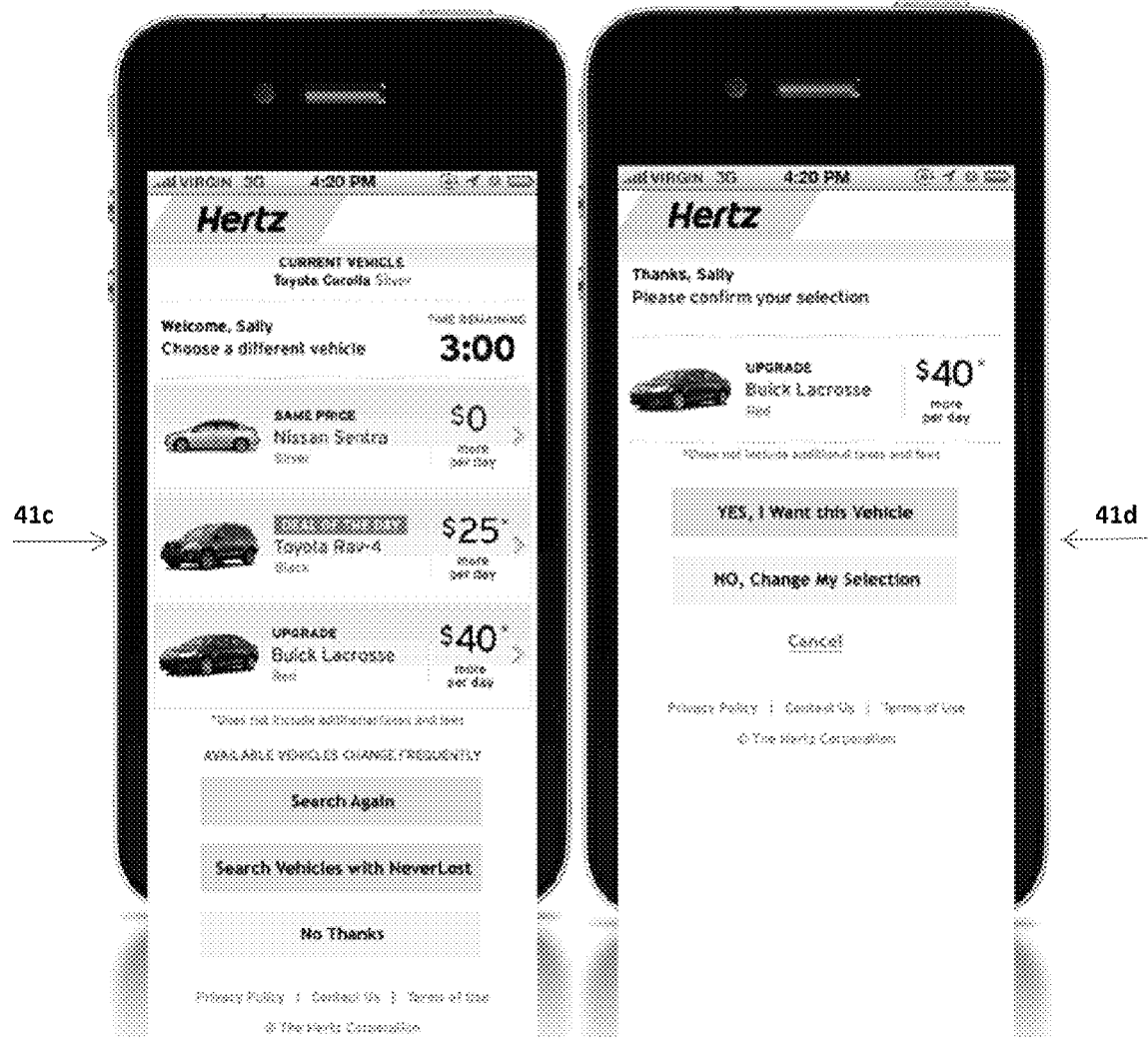
FIG. 5c is another representative alternate vehicle selection screen shot of an app according to the invention.
FIG. 5d is another representative alternate vehicle selection screen shot of an app according to the invention.
Figure 5E:
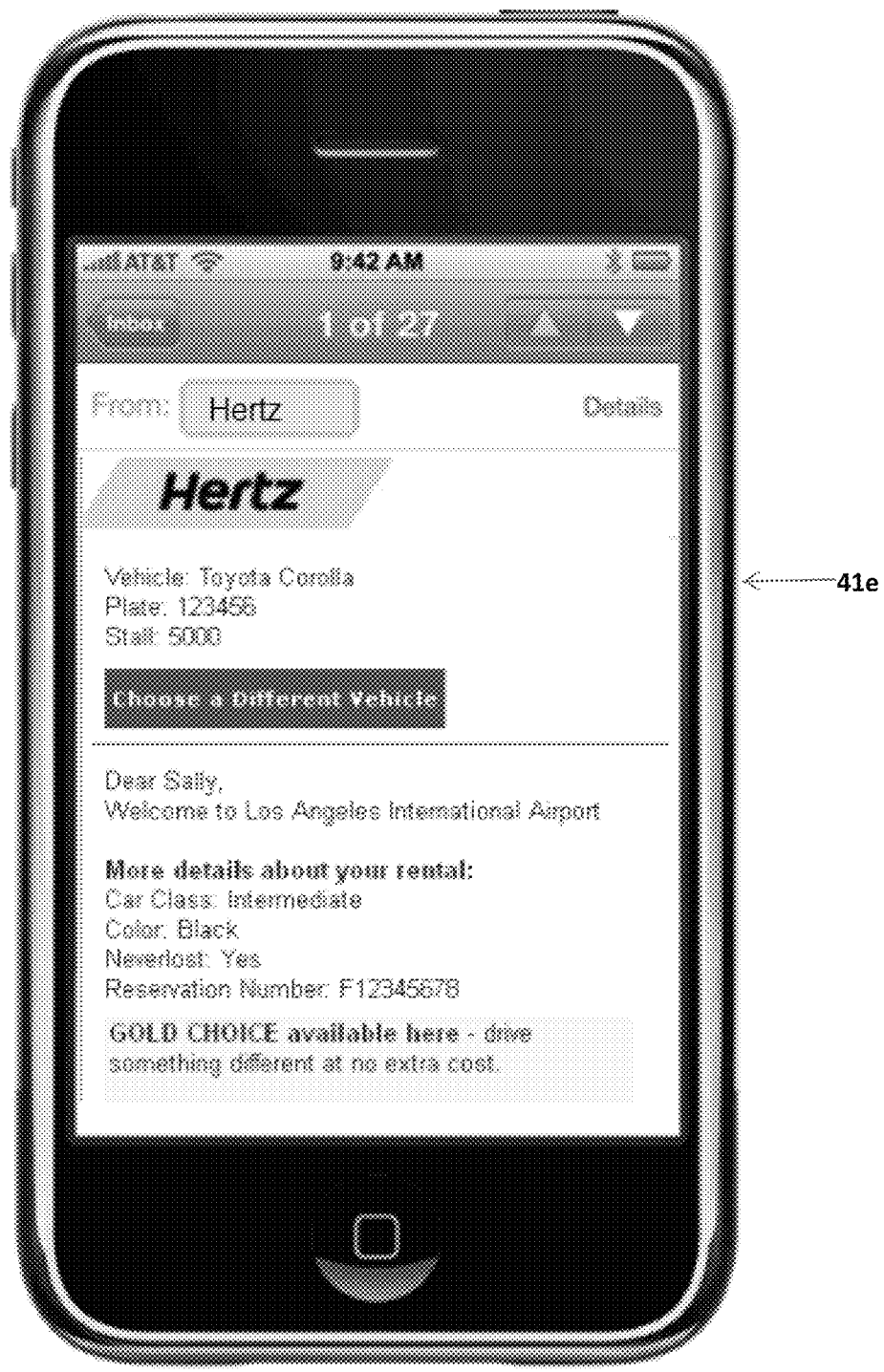
FIG. 5e is another representative alternate vehicle selection screen shot of an app according to the invention.

The various features of the invention may be illustrated by a description of a sample trip taken by a traveler, with respect to which the program instructions for personal device 12 are illustrated schematically in FIG. 3. Before using the system for the first time, the traveler registers to use the system by creating a user profile, and downloads app 10 to his personal device 12 in a step 29, as described above. When planning a trip, the user logs into the system via the system website, and provides information about the trip such as dates, destinations, flight information, etc. Server 14 creates a trip record and stores this data in database 16. If the system is integrated with a vRAC system, and the user has already reserved a car through the vRAC system, as determined in step 30 shown in FIG. 3, some of the information may be automatically available and will not need to be entered manually. For example, a rental car reservation for airport pickup of the car will typically include arrival and departure airlines, flight numbers and times. Consequently, the system will already have the user's basic travel itinerary. Alternately or additionally, the system can operate as a portal to a vRAC system, and/or to airline, hotel and attraction reservation systems. The user can also manually enter more details about the trip such as hotel reservations and dates, times and locations for meetings and other events during the trip.

When the trip commences, the system automatically accesses the relevant airline or third-party flight information system server 18A and verifies the flight status and schedule. The system server 14 can send a message (e.g., an SMS text message and/or email) to device 12 to alert the user of any delays or changes to the flight. If the system is integrated with a vRAC system, the system can send a message to the rental car company server 18C notifying them of a flight delay so that the customer's car reservation can be held. The system may also send a message to the appropriate hotel reservation system server 18B notifying the hotel operator of a delay so that the traveler's room reservation can be held for late arrival.

Upon the traveler's arrival at the destination airport, whether or not the traveler has made a rental vehicle reservation, the system will see that the flight has arrived in a step 31 or 32, respectively, server 14 having accessed flight data from airline system server 18A. At this point, the system can recommend the best way for the traveler to get to his hotel or wherever he needs to go. This might include, for example, information on taxi, bus or rail transit from the airport. The system operator may partner with a taxi or limo company, in which case the system can automatically notify the taxi company that the traveler is at the airport and need transportation, and direct the traveler to a particular taxi or limo.

If the traveler has rented a car, the system can provide one or more messages with interactive vehicle pickup assistance, such as information on the location and times for shuttle buses to the rental car lot for a selected terminal, information on after hours pickup times, and/or prompts for user review feedback, in a step 34. Screen shots 35a-35f according to one embodiment of the vehicle pickup assistance aspect of the invention are illustrated in FIGS. 4a-4f, respectively. This feature of the app may operate in conjunction with a separate system in which the shuttle bus drivers themselves run a separate mobile app that provides real-time information to the central server about the location and status of the driver's shuttle.

In a step 36, which may be performed at any time, the traveler chooses whether or not to authorize app 10 to access his itinerary. If the traveler has provided the authorization, then the traveler's itinerary, including air travel arrival and departure information, as well as optionally locations and start times of events occurring during the traveler's stay, is pre-loaded into a GPS navigation system of the vehicle in a step 38. Once at the rental car lot, the system provides information about the reserved car (e.g., make, model, color, stall number) and guides the user to the car in the lot in a step 40. Preferably, device 12 displays a virtual arrow (not shown) on touch screen 20 to guide the user to the vehicle. In a preferred embodiment, the virtual arrow is presented so as to point the user in the direction of a fastest, shortest, and/or easiest path to the vehicle when the user holds touch screen 20 in an upright position. Forward and backward directions may be displayed in accordance with 2-D signage conventions (up indicating forward, down or an upside-down "U" indicating backward) or may appear in vanishing perspective to simulate depth on touch screen 20. In an alternative embodiment, the virtual arrow may appear as an undistorted virtual compass needle, literally pointing in the direction of the path to the vehicle when the user holds touch screen 20 in a horizontal orientation. Still another possibility is that the virtual arrow may alternately appear in vanishing perspective or in accordance with signage convention when touch screen 20 is held upright, and as a virtual compass needle when touch screen 20 is tilted to a horizontal orientation. In any of the foregoing embodiments, the position of the virtual arrow on the screen preferably updates continuously to point toward the path to the vehicle as device 12 moves. If the virtual arrow function is designed to only work when touch screen 20 is held in a particular orientation, then preferably, when touch screen 20 is held in a different orientation, a message is displayed prompting a user to reorient touch screen 20 to the particular orientation for virtual-arrow guidance. The virtual arrow preferably appears superimposed on an image "seen" by a camera of device 12 that is displayed on touch screen 20, and directly on an image of the rental vehicle when the rental vehicle comes into the view of the camera.

In addition, the system can provide options for alternate and/or upgraded vehicles, as discussed above. Representative screen shots 41a-41e of one embodiment of the alternate vehicle selection aspect of the invention are illustrated in FIGS. 5a-5e, respectively.

The system may optionally notify the traveler's hotel that the traveler has arrived at the airport and is on the way to the hotel. An estimated time of arrival can be predicted based on the location of the hotel, the traveler's location based on GPS data from device 12, the mode of transportation selected by the traveler, current traffic conditions between the airport and the hotel, etc. The hotel can then be prepared to welcome the traveler upon arrival, expediting the hotel check-in process.

During the trip, the system provides walking and/or driving directions as a guide to local dining establishments, entertainment venues, business offices, conference centers, and/or other destinations of interest. Directions are calculated using the GPS information from device 12, map information stored in database 16, and information obtained from third-party databases, as needed.

At the conclusion of the trip, in a step 42, app 10 remains enabled for the user's next trip scheduled through the system of the invention, preferably automatically, unless the user decides to disable app 10. This automatic continuation of the functionality of app 10 into the user's next trip preferably occurs whether or not the user made an advance rental vehicle reservation in step 30.

If the user did not rent a car at the airport, app 10 will nonetheless offer to provide navigation guidance upon the traveler's arrival in a step 33. If the traveler authorized app 10 to access his itinerary in step 36, app 10 provides guidance appropriately tailored to the traveler's itinerary in a step 44, for example by providing one or more suggested modes of transportation to the traveler's first destination (which may for example be a hotel, meeting location, or convention center), including directions to each or a selected one of the suggested modes. If the traveler did not authorize app 10 to access his itinerary, app 10 may simply prompt the traveler to manually enter a destination and then guide the traveler to the destination, and to any subsequent destinations upon request, in a step 46.

In case the traveler elects to rent a car upon arrival at the airport or at some other time during his trip, the system can guide him from the arrival gate, his hotel, or some other location to a local car rental location with vehicles available at the appropriate time, such as a "24/7" location if appropriate. Preferably, the system is integrated with a vRAC system for such local rental location and the entire rental process can be accomplished using device 12 without the need for the traveler to visit an office.

As the end of the trip approaches, the system monitors flight status, notifies the user of any flight schedule changes or delays, and sends a message to alert him when to leave his current location to get to the airport in time for the flight. This alert is based on the traveler's location as indicated by the GPS unit in device 12, the distance and current traffic conditions between that location and the airport, and other factors. The system also provides an interface for web-based online check-in for the flight.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A mobile itinerary management system comprising:
    a central server operably connected to a database containing map information;
    at least one third party server;
    a mobile electronic device including a GPS component, being configured to transmit its location determined by the GPS component to the central server, and operating an application program installed on the mobile electronic device;
    means for communicating data between the central server and the mobile electronic device; and
    means for communicating data between the central server and the at least one third-party server;
    the central server configured to receive and store profiles of a plurality of customers, said profiles including customer itinerary information, customer vehicle comfort setting preferences, a customer location preference pertaining to a preferred location or preferred category of locations transmitted to the server by a customer,
    the central server configured to search the map information for locations matching the customer location preference,
    the central server configured to automatically transmit a matching preferred location message to the mobile electronic device identifying a matching preferred location found in the map information within a predetermined travel distance or travel time from a location of the mobile electronic device determined by the GPS component;
    the mobile electronic device configured to receive and present said matching preferred location message to the customer,
    the central server configured to receive a flight status update indicating a change in the departure and/or arrival time of a scheduled airline flight automatically transmitted from the third-party server and transmit the flight status update automatically in real time to the mobile electronic device,
    the mobile electronic device configured to receive and present a message indicating said flight status update to the customer,
    the mobile electronic device application program including instructions for a user login, entered into a mobile electronic device running the application program, to be transmitted from the mobile electronic device to the central server,
    the central server, in response to receiving the user login, being programmed with instructions to compare the received user login to stored user logins associated with the stored user profiles, and if the received user login matches one of the stored user logins, to transmit said customer itinerary information from the corresponding stored customer profile to the mobile electronic device, the itinerary information including at least one event having a scheduled time and location,
    the application program further including instructions to determine a travel time between a location of the mobile electronic device indicated by the GPS component and the scheduled event location based on said map information stored in the database and current traffic conditions, and to cause the mobile electronic device to present a reminder of the event at a reminder time preceding the scheduled time by at least the travel time,
    the application program further configured to communicatively link the mobile electronic device to a rental vehicle, to receive said customer vehicle comfort setting preferences from the central server, and to cause the rental vehicle to adjust comfort settings to a state determined by said comfort setting preferences,
    the application program further configured to automatically receive information indicating a driving condition requiring an action by the customer and to automatically communicate a driving condition alert message indicating the driving condition to the customer, the driving condition alert message being automatically triggered by the occurrence of any of a predetermined weather condition, a predetermined traffic condition, and a predetermined vehicle condition automatically communicated by the rental vehicle to the mobile electronic device, and
    the application program further configured to cause the mobile electronic device to display a damage reporting image of the rental vehicle on a touch screen, to detect a touch of the customer on the touch screen at a location on said damage reporting vehicle image, and to transmit a message to the central server indicating damage to the vehicle at a location on the vehicle corresponding to the touched location on the image.

2. The system of claim 1, the matching preferred location message further including an estimated fastest route to the matching preferred location from the location of the mobile electronic device.

3. The system of claim 1, wherein the customer vehicle comfort setting being selected from a seat position parameter, a seat contour setting, a steering wheel position parameter, a pedal position parameter, and a mirror position parameter, the customer profile includes information indicating a physical attribute of a rental customer, and the rental vehicle adjusts the comfort setting to a predetermined setting based on the physical attribute.

4. The system of claim 3, the seat position parameter comprising a setting selected from a forward-rearward seat position, a seat height, and a seat tilt.

5. The system of claim 1, the comfort setting selected from the group consisting of a thermostat temperature, a fan setting, a seat warmer setting, a radio volume, and a radio station frequency.

6. The system of claim 1, wherein the application program enables the mobile electronic device to transmit customer vehicle comfort setting preferences to the central server and to download customer vehicle comfort setting preferences from the central server.

7. The system of claim 1, the application program configured to cause the mobile electronic device to permit a user to specify a type of damage to the rental vehicle by touching an area of the screen indicating the damage type.

8. The system of claim 7, the application program configured to cause the mobile electronic device to display a plurality of damage-type markers, each marker indicating a different type of vehicle damage, and to permit a user to touch the image of a particular marker on the screen and drag the image to a location on the vehicle image to indicate a location on the vehicle of damage of a type corresponding to the marker.

9. The system of claim 1, the application program further directing the mobile electronic device to store door-unlocking data corresponding to the customer in a memory of the mobile electronic device, the rental vehicle comprising receiving means mounted for wirelessly receiving the door-unlocking data from the mobile electronic device and means for automatically unlocking the doors of the vehicle in response to the receiving means receiving the door-unlocking data.

10. The system of claim 1, the predetermined vehicle condition being any of a fuel level, a battery charge level, a fluid level, an engine temperature, a brake wear condition, a tire pressure, and an abnormal vibration.

11. The system of claim 1, the matching preferred location message further including a recommendation of a mode of transportation from the location of the mobile electronic device to the matching preferred location.

12. The system of claim 11, the mode of transportation being selected from taxi, limousine, bus, rail, driving and walking.

13. The system of claim 11, the matching preferred location message further including a recommended route using the recommended mode of transportation.

* * * * *